(12) United States Patent
Pasca (10) Patent No.: US 12,169,334 B2
(45) Date of Patent: Dec. 17, 2024

(54) HEAD-UP DISPLAY WITH POLARIZERS AND THERMALLY CONDUCTING MATERIAL

(71) Applicant: Continental Automotive Technologies GmbH, Hannover (DE)

(72) Inventor: Andrei Pasca, Timisoara (RO)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/019,426

(22) PCT Filed: Jul. 26, 2021

(86) PCT No.: PCT/EP2021/070870
§ 371 (c)(1),
(2) Date: Feb. 2, 2023

(87) PCT Pub. No.: WO2022/028938
PCT Pub. Date: Feb. 10, 2022

(65) Prior Publication Data
US 2023/0280613 A1   Sep. 7, 2023

(30) Foreign Application Priority Data

Aug. 4, 2020  (EP) ................................... 20465552
Aug. 5, 2020  (DE) ..................... 10 2020 209 868.9

(51) Int. Cl.
*G02F 1/1335* (2006.01)
*B60K 35/00* (2024.01)
(Continued)

(52) U.S. Cl.
CPC ........ *G02F 1/133548* (2021.01); *B60K 35/00* (2013.01); *G02B 27/0101* (2013.01);
(Continued)

(58) Field of Classification Search
CPC ....................... G02F 2203/01; G02F 1/133548
See application file for complete search history.

(56) References Cited

U.S. PATENT DOCUMENTS 6,271,901 B1 *   8/2001   Ide ..................... G02F 1/133536
                                                           349/98
10,018,871 B1 *   7/2018   Song ...................... C09K 11/06
(Continued)

FOREIGN PATENT DOCUMENTS

DE   102011014145 A1   6/2012
DE   102018103476 A1   8/2018
EP        1126292 A2   8/2001

OTHER PUBLICATIONS

Office Action dated Mar. 3, 2021 from corresponding German patent application No. 10 2020 209 868.9.
(Continued)

*Primary Examiner* — Lauren Nguyen (57) ABSTRACT

A head-up display unit with a picture generating unit for creating an image to be displayed as a virtual image to a viewer and an optical unit for projecting the image to be displayed towards an eyebox is disclosed. The picture generating unit comprises a liquid crystal layer, a front polarizer, a back polarizer and a reflective polarizer. The reflective polarizer is arranged upstream the front polarizer and downstream the liquid crystal layer.

5 Claims, 7 Drawing Sheets

(51) Int. Cl.
*B60K 35/23* (2024.01)
*G02B 27/01* (2006.01)
*G02F 1/1333* (2006.01)

(52) U.S. Cl.
CPC .. *G02F 1/133385* (2013.01); *G02F 1/133536* (2013.01); *G02F 1/133628* (2021.01); *B60K 35/23* (2024.01); *B60K 2360/23* (2024.01); *B60K 2360/25* (2024.01); *G02B 2027/0118* (2013.01); *G02F 1/133514* (2013.01); *G02F 2203/01* (2013.01)

(56) References Cited

U.S. PATENT DOCUMENTS

| | | |
|---|---|---|
| 2005/0200771 A1 | 9/2005 | Lazarev et al. |
| 2006/0055844 A1 | 3/2006 | Mi |
| 2006/0109398 A1 | 5/2006 | Mi |
| 2007/0024776 A1 | 2/2007 | Jeng et al. |
| 2013/0279016 A1 | 10/2013 | Finger |
| 2018/0239133 A1 | 8/2018 | Seder et al. |
| 2020/0050054 A1* | 2/2020 | Lin .................. G02B 5/3025 |

OTHER PUBLICATIONS

International Search Report and Written Opinion dated Oct. 26, 2021 from corresponding International patent application No. PCT/EP2021/070870.

* cited by examiner

HEAD-UP DISPLAY WITH POLARIZERS AND THERMALLY CONDUCTING MATERIAL

CROSS REFERENCE TO RELATED APPLICATIONS

This U.S. patent application claims the benefit of PCT patent application no. PCT/EP2021/070870, filed Jul. 26, 2021, which claims the benefit of European patent application no. 20465552.6, filed Aug. 4, 2020, and German patent application no. 10 2020 209 868.9, filed Aug. 5, 2020, all of which are hereby incorporated by reference.

TECHNICAL FIELD

The present disclosure is related to a head-up display unit being adapted to high working temperatures, especially temperatures above 90° C., and to high backlight intensity. The disclosure is further related to a method to produce such a head-up display unit and a vehicle comprising such a head-up display.

BACKGROUND

A head-up display, also referred to as a HUD, is a display system in which the viewer may maintain his viewing direction, because the contents to be displayed are displayed in his field of vision. While such systems, due to their complexity and costs, were originally mainly used in the aviation sector, they are now also being used in large scale in the automotive sector, as they allow easy reading of critical information without the need to change the eye gaze from the road to an in-cabin instrument cluster.

Head-up displays generally consist of a picture generating unit (PGU), an optical unit and a mirror unit. The picture generating unit generates the image to be displayed. The optical unit directs the image to the mirror unit. The mirror unit is a partially reflecting, translucent pane, which reflects the light in such way that it reaches the so-called eyebox. The eyebox is an area whose height and width correspond to a theoretical viewing window. As long as an eye of the viewer is inside the eyebox, all elements of the virtual image are visible to the eye. If, on the other hand, the eye is outside the eyebox, the virtual image is only partially or not at all visible to the viewer. The larger the eyebox is, the less restricted the viewer is in his choice of sitting position.

The viewer sees the content displayed by the picture generating unit as a virtual image and at the same time the real world behind the translucent pane. In the automotive sector, the windscreen often serves as a mirror unit, the curved shape of which must be taken into account in the representation. However, the mirror unit may also be a dedicated screen, called combiner. Through the interaction of the optical unit and the mirror unit, the virtual image is an enlarged representation of the image generated by the picture generating unit.

The picture generating unit and the optical unit of a head-up display are typically arranged in a common housing assembly, which may also include electronic components necessary for operation of the head-up display. The housing assembly is sealed with a cover glass and protects the various components from damage as well as dust or other environmental influences. Furthermore, the housing assembly helps to simplify mounting of the head-up display in a vehicle, as all necessary components may be installed in a single production step.

An important requirement for head-up display applications is the necessary brightness of the virtual image, which needs to be in order of at least 5 000 cd/m$^2$, but preferably in the range 10 000 to 15 000 cd/m$^2$. Current head-up display solutions typically comprise a picture generating unit that uses a liquid crystal display (LCD) for creating the image to be displayed. In view of all the components that are placed in the optical path of the system, this high brightness requirement translates to a brightness requirement on the top surface of the display panel that is about five to ten times larger, i.e. 50 000 to 100 000 cd/m$^2$. Given the typical transmittance of an LCD panel of around 5 to 6%, this translates to a backlight requirement in the order of 1 000 000 to 2 000 000 cd/m$^2$. The high brightness requirements for the display lead to a series of problems when an LCD is used in a head-up display, which are mainly due to the low transmittance.

A first issue is the high thermal impact due to the heat generated by the backlight unit and the luminous power dissipated by the absorption in the display panel of around 95% of the incoming light. Critical aspects in this regard are the clearing temperature of the liquid crystal and the temperature performance of the polarizers attached to the liquid crystal panel. If the temperature of the polarizers exceeds a certain limit, the polarizer may lose its light polarizing properties and the display becomes bright where it should be dark or vice versa. If the temperature of the liquid crystal exceeds the clearing temperature, the liquid crystal may lose its light polarizing properties and the display becomes transparent.

A second issue is the high power consumption required for achieving the high brightness of the backlight, which usually is in the order of 10 W or more for problematic applications, independent of the actual display content.

Head-up displays require very bright backlight in order to generate a virtual image that is visible even under bright outside light conditions. In HUD most display areas are black, as usually only symbols are shown. This means that a large part of the backlight is dissipated in the display causing heat. Liquid-crystal materials do not operate properly above a certain temperature, the so-called clearing temperature. It is desired to keep the liquid-crystal materials temperature below the clearing temperature.

US 2013/279016 A1 relates to preventing LCD of a HUD from overheating. A reflective polarizer is arranged downstream the output polarizer of the liquid-crystal panel, thus reflecting light that otherwise would be blocked by the output polarizer. Thus, heating of the output polarizer is reduced. This means that the reflective polarizer is used to prevent a part of the sunlight with a polarization perpendicular with the front polarizer to hit the display.

EP 1 126 292 A2 relates to an optical polarizer consisting of a combination of reflective polarizer and dicroic polarizer. Such polarizer is for example used in an LCD. This patent describes the construction of the combination between a reflective polarizer and a normal polarizer and names several possible applications. Typically, the reflective polarizers are used to improve the brightness of a standard LCD by recycling a part of the reflected light—that means that the light that is reflected back from the display will re-enter the backlight structure where its polarization plane will be re-aligned by the structure to match the polarization plane required by the back polarizer of the display. This is also the application described in EP 1 126 292 A2.

It is an object of the present disclosure to provide an improved solution for a head-up display with high brightness.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to the disclosure, a head-up display unit is provided with a picture generating unit for creating an image to be displayed as a virtual image to a viewer and an optical unit for projecting the image to be displayed towards an eyebox wherein the picture generating unit comprises a liquid crystal layer, a front polarizer, a back polarizer and a reflective polarizer. The reflective polarizer is arranged upstream the front polarizer and downstream the liquid crystal layer. The light of a "wrong" polarization is not dissipated at the front polarizer but reflected back and re-used. Thus, the front polarizer heats up less which means a longer lifetime and/or less need for cooling measures.

According to an embodiment an optically clear medium is provided between reflective polarizer and front polarizer. The optically clear medium is for example an air gap, or consists of a highly thermally conductive material. The heat is dissipated to the display edges thus reducing the displays thermal load.

For example, the reflective polarizer is a metal wire grid polarizer. This combines the properties of reflective polarizer and heat dissipation.

According to an embodiment of the disclosure, a colour filter is arranged downstream the reflective polarizer. The reflected light has the full bandwidth, thus an increased light recycling effect is reached as well as reduced heat dissipation in the colour filter.

According to another embodiment of the disclosure are further reflecting polarizer is arranged downstream the back polarizer. This increases light recycling effect by also recycling light at the back side. In addition, heat dissipation inside the liquid crystal display panel is further reduced.

According to one aspect of the disclosure, a vehicle comprises a head-up display unit according to the disclosure for generating an image for a user of the vehicle. The vehicle may, for example, be a car or an aircraft. Of course, the disclosure solution may also be used in other environments or for other applications, e.g. in trucks, busses, in railway and public transport, cranes and construction machinery, etc.

BRIEF DESCRIPTION OF THE DRAWINGS

Further features of the present disclosure will become more fully understood from the following detailed description and the accompanying drawings, wherein.

DETAILED DESCRIPTION

For a better understanding of the principles of the present disclosure, embodiments of the disclosure will be explained in more detail below with reference to the figures. Like reference numerals are used in the figures for the same or equivalent elements and are not necessarily described again for each figure. It is to be understood that the disclosure is not limited to the illustrated embodiments and that the features described may also be combined or modified without departing from the scope of the disclosure as defined in the appended claims.

Figure 1:
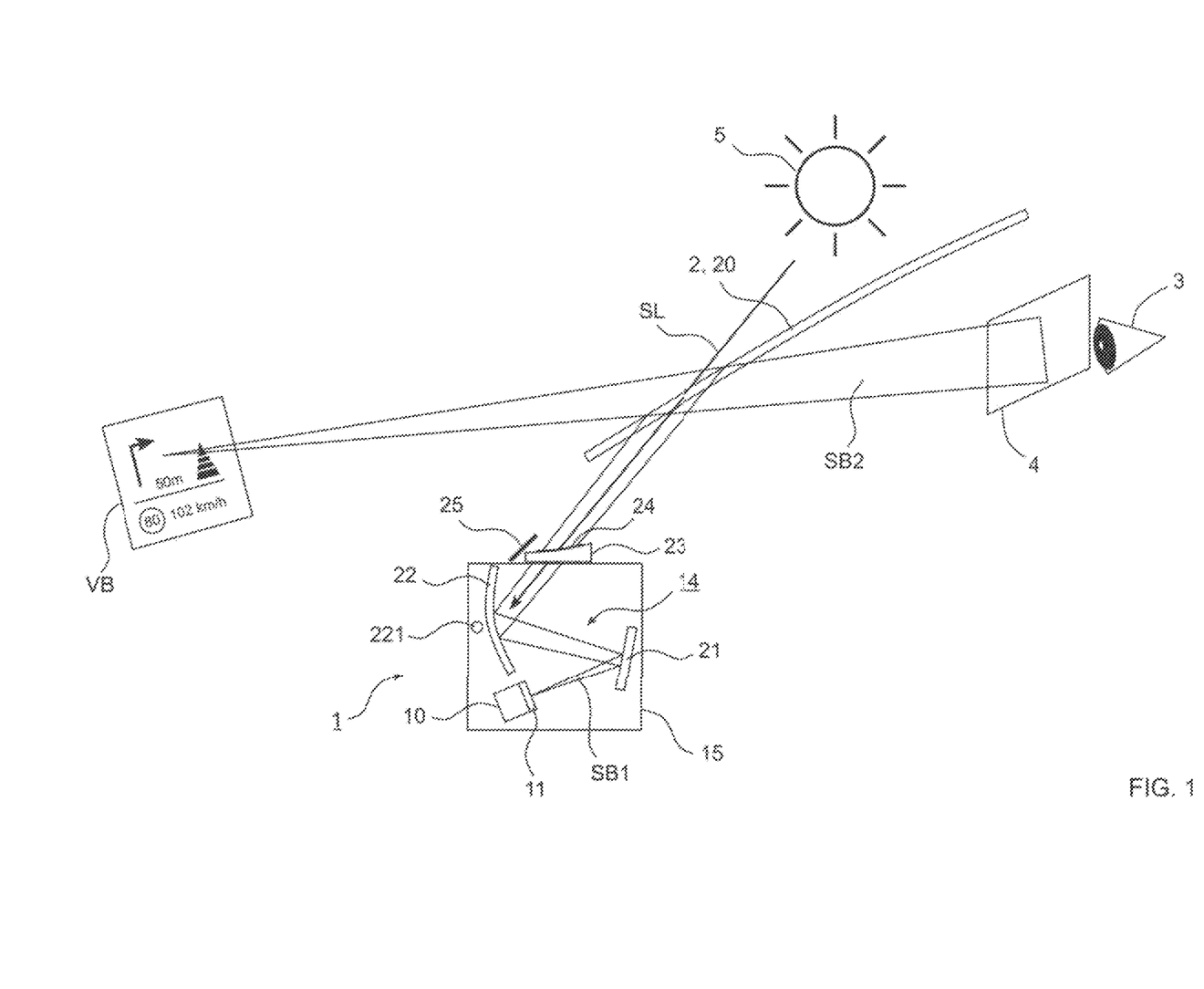
FIG. 1 shows a sketch of a state-of-the-art head-up display for a motor vehicle.

FIG. 1 shows a sketch of a state-of-the-art head-up display unit 1 for a motor vehicle. The head-up display unit 1 has a picture generating unit 10, an optical unit 14 and a mirror unit 2. A beam SB1 emanates from a liquid crystal display 11 of the picture generating unit 10 and is reflected by a folding mirror 21 onto a curved mirror 22, which reflects it in the direction of the mirror unit 2. The mirror unit 2 is shown here as a windscreen 20 of the motor vehicle. From there, the beam SB2 is directed towards the eye 3 of an observer.

The observer sees a virtual image VB, which is located outside the vehicle above the bonnet or even in front of the vehicle. Due to the interaction of the optical unit 14 and the mirror unit 2, the virtual image VB is an enlarged representation of the image displayed by the display 11. Here a symbolic speed limit, the current vehicle speed and navigation instructions are displayed. As long as the eye 3 is located inside the eyebox 4 indicated by a rectangle, all elements of the virtual image VB are visible to the eye 3. If the eye 3 is located outside the eyebox 4, the virtual image VB is only partially or not at all visible to the viewer. The larger the eyebox 4 is, the less restricted the viewer is in his choice of the seating position.

The curvature of the curved mirror 22 is adapted to the curvature of the windscreen 20 and ensures that the image distortion is stable over the entire eyebox 4. The curved mirror 22 is rotatably supported by a bearing 221. By rotating the curved mirror 22, it is possible to shift the eyebox 4 and thus to adjust the position of the eyebox 4 to the position of the eye 3. The folding mirror 21 ensures that the distance travelled by the beam SB1 between the display 11 and the curved mirror 22 is long, while, at the same time, the optical unit 14 remains compact. The optical unit 14 and the picture generating unit 10 are accommodated in a housing assembly 15 and separated from the environment by a transparent cover 23. The optical elements of the optical unit 14 are thus protected, for example, against dust inside the vehicle. An optical foil or polarizer 24 may be located on the cover 23. The display 11 is typically polarized and the mirror unit 2 acts like an analyser. The purpose of the polarizer, or glare trap, 24 is to influence the amount of sunlight entering the head-up display. A light trap 25 serves to securely shield light reflected from the road or to block light from different sources placed at car height level so that it does not reach the observer. In addition to sunlight SL coming from the sun 5, also light from another source of interference might reach the display 11.

Figure 2:
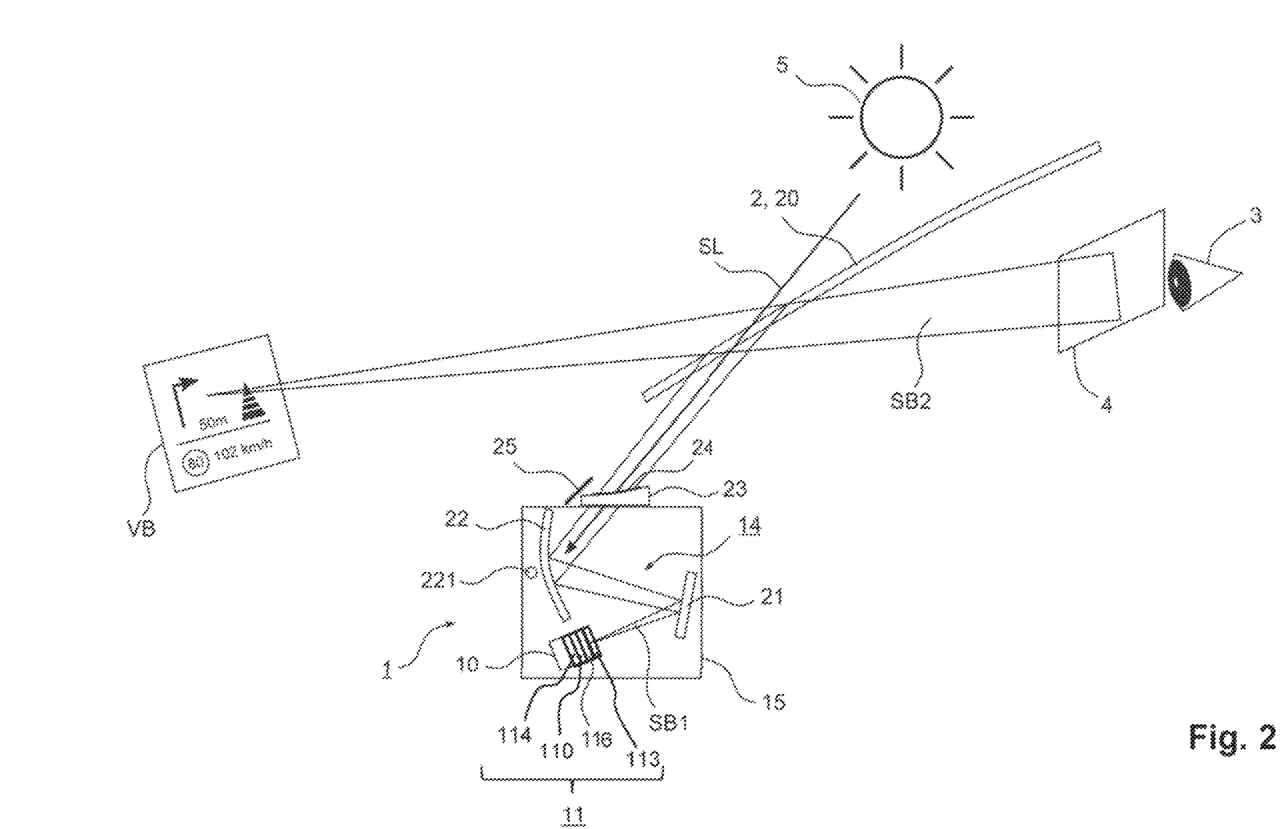
FIG. 2 shows a sketch of a head-up display according to the disclosure.

FIG. 2 shows a sketch of a head-up display according to the disclosure. The head-up display is similar to the head-up display of FIG. 1, but the liquid crystal display 11 is diagrammatically depicted as being provided with a front polarizer 113, a reflective polarizer 116, a liquid crystal layer 110 and a back polarizer 114 arranged in this order when viewed in upstream direction. The light passes from a backlight 13 (not shown here) downstream through back polarizer 114, liquid crystal layer 110, reflective polarizer 116 and front polarizer 113.

Figure 3:
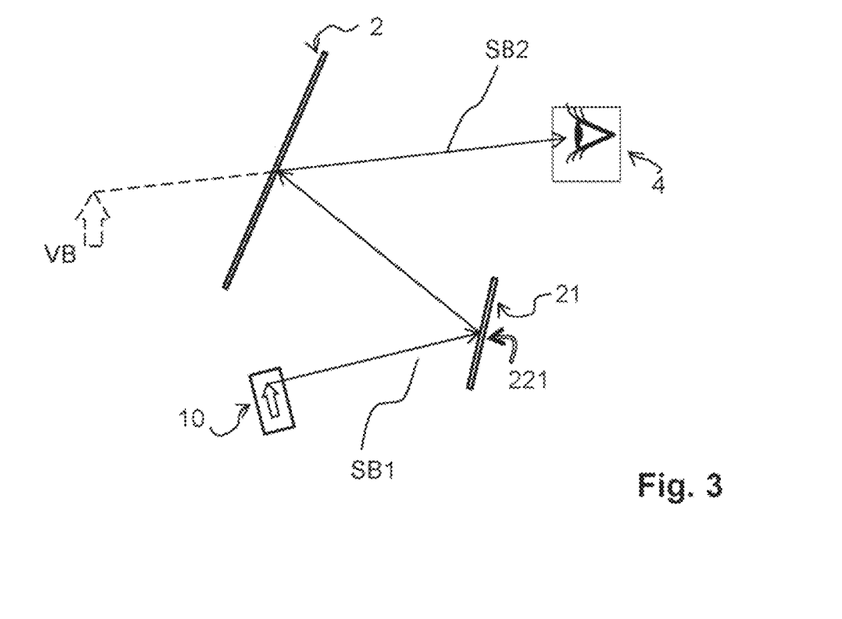
FIG. 3 shows a simplified sketch similar to FIG. 2.

FIG. 3 shows a simplified sketch similar to FIG. 2. Here, only a single mirror, folding mirror 21, is shown. A Head-up Display, also referred to as HUD, is used to place information in the field of view of the user in such a way as to appear integrated in the surrounding environment. The intention is to provide the information in a way that does not require the user to significantly change the eye gaze direction and/or focus distance. HUDs are of particular importance in avionics and the automotive fields where they allow the vehicle's operator to glance important aspects of the trip without taking the eyes away from the path ahead. For this purpose, state of the art HUDs are required to deliver this information clearly discernible, independent of the ambient light level. This translates in high brightness requirements in excess of 10,000 cd/m$^2$ or even 15,000 cd/m$^2$ for the virtual image produced by the HUD. One of the preferred architectures for HUDs, as depicted in figure, comprises an image generating unit 10, an intermediate mirror, the folding mirror 21, and a transparent HUD screen, the mirror unit 2. As a note, this diagram should be understood as one of the possible embodiments and should not be regarded as restrictive to the present disclosure.

The image generating unit 10 is responsible for producing the symbols that shall be visible to the end user. The optical system from the depicted embodiment, consisting of the folding mirror 21 and the HUD screen, mirror unit 2, is designed in such a way as to produce a virtual image VB from the images generated by the generator unit 10 that are magnified and seen at a certain distance in front of the mirror unit 2. As a note, the mirror unit 2 is formed with the aid of an optically clear medium in order to not impede the visibility of the end user's environment. This mirror unit 2 may be a dedicated component, typically called combiner, or it may be formed as a region on the vehicle's windshield.

Figure 4:
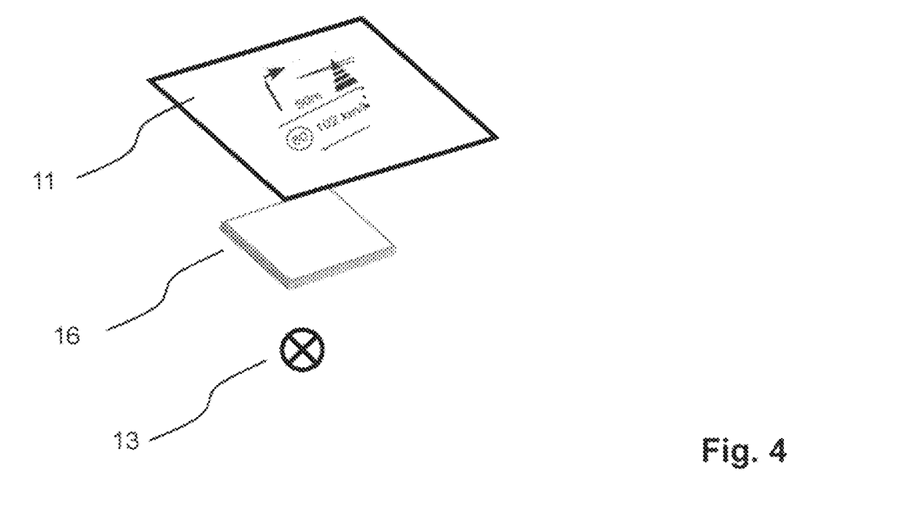
FIG. 4 shows a picture generating unit in a simplified diagrammatic view.

FIG. 4 shows the picture generating unit 10 in a simplified diagrammatic view. The light source illuminates via a light control structure 16 a liquid crystal display 11 on which an image is displayed that corresponds to the virtual image VB to be shown to the user. Given the topology of the optical system used to create the virtual image VB based on the images produced by the picture generating unit 10, the brightness of the symbols displayed by the image generating unit should be around five times larger than the required virtual image brightness. This translates in brightness levels in excess of 50,000 cd/m$^2$ to 75,000 cd/m$^2$ at the surface of the picture generating unit 10. Typically, the image picture generating unit 10, as seen in the figure, consists of a backlight source, backlight 13, some light control structures 16, not shown here in detail, like diffusers, brightness enhancement films, micro-lens arrays, but without being limited to these enumerated components, and a transmissive liquid crystal display 11, also referred to as LCD.

Given the description of one of the preferred embodiments for the state of the art HUD it is clear that the transmissive LCD has to operate with very large brightness levels. Compared to 150 cd/m$^2$ to 500 cd/m$^2$ employed for most other display applications, ranging from flat panel TVs to computer monitors, mobile phones or fully programable instrument clusters, it is evident that in HUD applications, the display panel must operate with brightness levels 50 to 200 times larger than typical applications.

Generating large amounts of light, even with highly efficient LED light sources, requires large powers for the backlight unit. A typical electrical power value required by the backlight unit is situated around 10 W-15 W. Out of this, about a third is converted into luminous power, with the rest of 6-10 W being thermally dissipated. Given the close proximity between the liquid crystal display 11 unit and the backlight unit 13, a large fraction of the thermally dissipated power will heat up the display panel, including the liquid crystal layer 110. Moreover, since the images typically generated by HUDs are using only a limited panel area for bright symbols (around 10% of the display area) and the transmittance of the panel in the bright symbols areas is typically 10% or below, also the 3 to 5 W of the luminous power produced by the backlight unit 13 are dissipated mostly inside the LCD panel. This dissipated power further increases the temperature of the display panel. Another major contributing factor for the thermal problem is sunlight SL radiation coming from the exterior of the system. Given the architecture of the optical path of a typical HUD application, the display panel would be directly visible from various positions, most notably from directly above the windscreen 20. This means that at certain times of the day and for some specific vehicle positions, the front side of the display may be directly illuminated by sunlight SL with brightness levels that are typically much larger than the light produced by the backlight unit 13. Again, this luminous power given by the sun would be mostly dissipated inside the display panel which normally has a black appearance.

Figure 5:
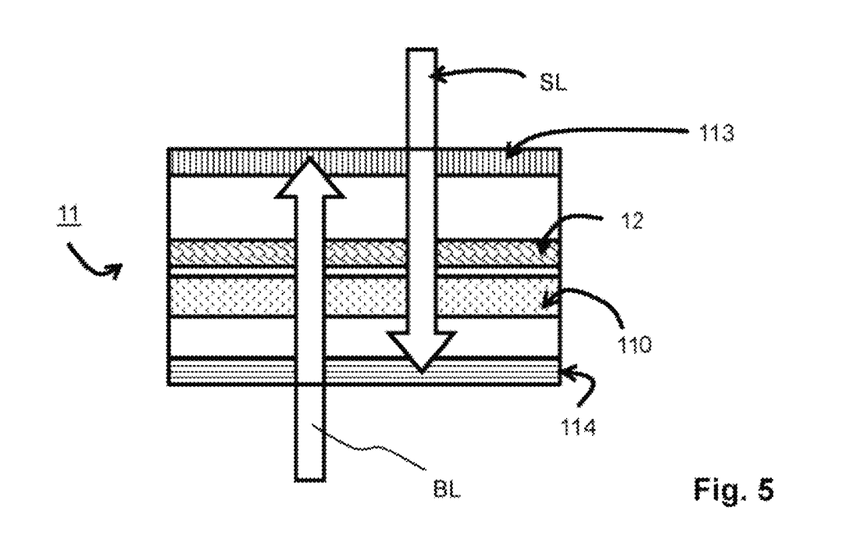
FIG. 5 illustrates where incident light on a liquid crystal display gets dissipated.

FIG. 5 illustrates in a simplified manner the positions where the incident light on both sides of the liquid crystal display 11 gets dissipated. As it may be seen, the incident sunlight SL enters the liquid crystal display 11 panel through the front polarizer 113. The light that has the polarization plane aligned with that of the front polarizer 113 is able to enter the rest of the display structure. It should be noted that the optical path of the HUD may contain some other elements that already select only the light that is aligned with the front polarizer 113 in order to limit the amount of sunlight SL that can reach the display surface. An important fraction (around 70%) of the light that enters the panel from the front side will be dissipated inside the colour filter 12 layer. The rest of the light that is able to cross the colour filter 12 layer would enter the liquid crystal layer 110. However, given that most probably the incident sunlight SL lands on a black display area, the liquid crystal material is typically in the relaxed position and would not rotate the orientation of the polarization plane. With this, the incident sunlight SL will pass through it without substantial alteration and will reach the back polarizer 114 layer. Considering the orientation of the polarization planes of the front polarizer 113 and the back polarizer 114, this means that the remaining fraction of the sunlight SL (around 25-30%) will be absorbed by the back polarizer 114. Looking at the backside of the display 11, the backlight BL that has the polarization plane aligned with the back polarizer 114 is able to enter the display 11 panel. As was the case for the frontside illumination, the optical path of the system may contain elements that already select the proper polarization plane of the backlight BL in order to limit the amount of light that would be absorbed by the display 11 panel. From the backlight BL that enters the display 11 panel, most of it will pass through the liquid crystal layer 110 (in the order of 90%) and would reach the colour filter 12 layer. Here, again, a large fraction will be absorbed and only around 25-30% of the incident backlight BL will be able to cross the colour filter 12. Since most of the display surface must be black, the polarization plane of the backlight BL that is able to cross the colour filter 12 layer must be perpendicular to the polarization plane imposed by the front polarizer 113. This means that the remaining backlight BL fraction will be absorbed by the front polarizer 113. From this description, it is evident that the incoming light will be dissipated (i.e. transformed into heat) mostly by the colour filter layer (for both, front and back light), the back polarizer 114 layer (for front light) and the front polarizer 113 layer (for backlight). Given the high brightness requirements and since almost all of the incident light is absorbed in the display 11 panel, the LCD in HUD applications may reach very high temperatures, close to the limiting values of the system's components. Additionally, the display 11 panel receives also an important fraction of the heat that is dissipated by the backlight unit 13. A particularly difficult condition for the HUD system is at the start-up of the system after the vehicle was stopped or parked for a long period under direct sunlight during summer. In this situation, the temperature reached inside the vehicle may be in the order of 60 to 80 degrees centigrade. If sunlight is also shining directly on the display surface, the temperature reached by the panel is even higher. After this parked condition, if the user wants to use the HUD system, given the high ambient light levels, the backlight unit 13 of the system must provide very high intensity levels that, associated with the images typically showed on the display 11 panel and the conversion efficiency of the unit, will further lead to an increase in the panel temperature. Of course, in parallel with this, the end user will set the vehicle's controls in order to reduce the inside temperature to acceptable levels. However, given the thermal inertia of the system's components, there will be a race between the rising temperature induced by the HUD operation and the decreasing ambient temperature. The lower the thermal inertia of the display 11 panel, the quicker the panel will reach dangerous temperatures before the vehicle's ambient temperature decrease to lower values. From the LCD components, the most affected are the front polarizer 113 and back polarizer 114 films (with maximum temperatures in the order of 105 degrees) and the liquid crystal layer 110 (with the clearing temperature typically above 110° C. for HUD applications). It is clear that in the previously described scenario, the display 11 panel's temperature approaches dangerously these levels and the system may need to decrease severely the brightness of the virtual image VB or even to shut down in order to prevent any damage to the display. The present disclosure especially addresses the sensitivity to thermal transients of the sensitive components of displays 11 used in HUD applications.

Figure 6:
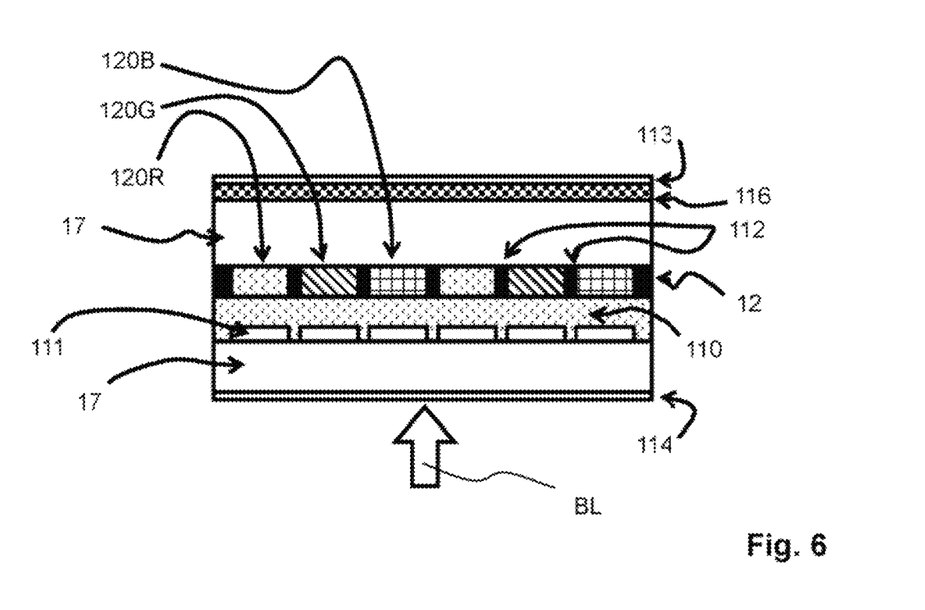
FIG. 6 shows a way to limit the light absorption in the front polarizer of a liquid crystal display according to the disclosure.

FIG. 6 shows a way to limit the light absorption in the front polarizer 113 of a liquid crystal display 11 according to the disclosure. Between the liquid crystal layer 110 and the front polarizer 113 layer another reflective polarizer 116 layer is interposed. The reflective polarizer 116 layer reflects the light with a specific orientation of the polarization plane and lets pass through the light with the orientation of the polarization plane perpendicular to the first one.

In the figure, relative sizes are not to scale. Assuming that all optical elements are ideal, the white backlight BL first passes through a light polarizing layer, the back polarizer 114, that selects only the light that has its polarization plane aligned with that required by the display. At this point, about 50% (a factor of 0.5) of the incoming unpolarized light is absorbed as its polarization plane is not aligned with the display polarizer.

After this, the remaining backlight passes a supporting structure 17 and enters the active pixel area, the liquid crystal layer 110. Pixel driving elements 111 are driven by a driver (not shown here) according to the data to be displayed. The pixel driving elements 111 cause the liquid crystal substance of the liquid crystal layer 110 to rotate polarization depending on an applied signal. The polarization plane of the light passing the liquid crystal layer 110 will be modulated by the data to be displayed with the aid of the liquid crystal layer 110. After the modulation, the light passes through the colour filter 12 layer where it gets filtered so that only the required spectral components, i.e. red through colour filter element 120R, green through colour filter element 120G or blue through colour filter element 120B, may exit the display panel. At this point, about 70% (i.e. a factor of 0.7) of the light that is incident on the colour filter elements 120R, 120G, 120B gets absorbed, so only around 30% (that is a factor of 0.3) of the incoming modulated light may pass through. Additionally, the colour filter 12 layer also delimits the individual colour subpixels with the aid of a black opaque material of which pixel aperture walls 121 of a black matrix 1210 that separate the colour specific filter elements 120R, 120G, 120B. This sets in the end the pixel aperture ratio, that is, the ratio between the active pixel area and the total pixel area (typically around 0.6 to 0.8, or, in percent 60% to 80%) and further limits the amount of light that is capable of exiting the display.

Finally, the modulated and coloured light passes through another support structure 17, is either reflected by the reflective polarizer 116 or passes through the reflective polarizer 116 and enters another polarizer layer, the front polarizer 113. Front polarizer 113 transforms the light polarization variations induced by the liquid crystal layer 110 into brightness variations, resulting in the desired colour image. The display transmittance in the ideal case, where no other optical material induces losses may be estimated by multiplying the above factors resulting in around 50%×30%× (60% to 80%) which is 9% to 12%. As a note, all subsequent descriptions will use a less detailed description of the display panel, invoking only layers that have an active role in the present invention. Additionally, the relative sizes of the involved elements are not necessarily drawn to scale.

Figures 7, 9:
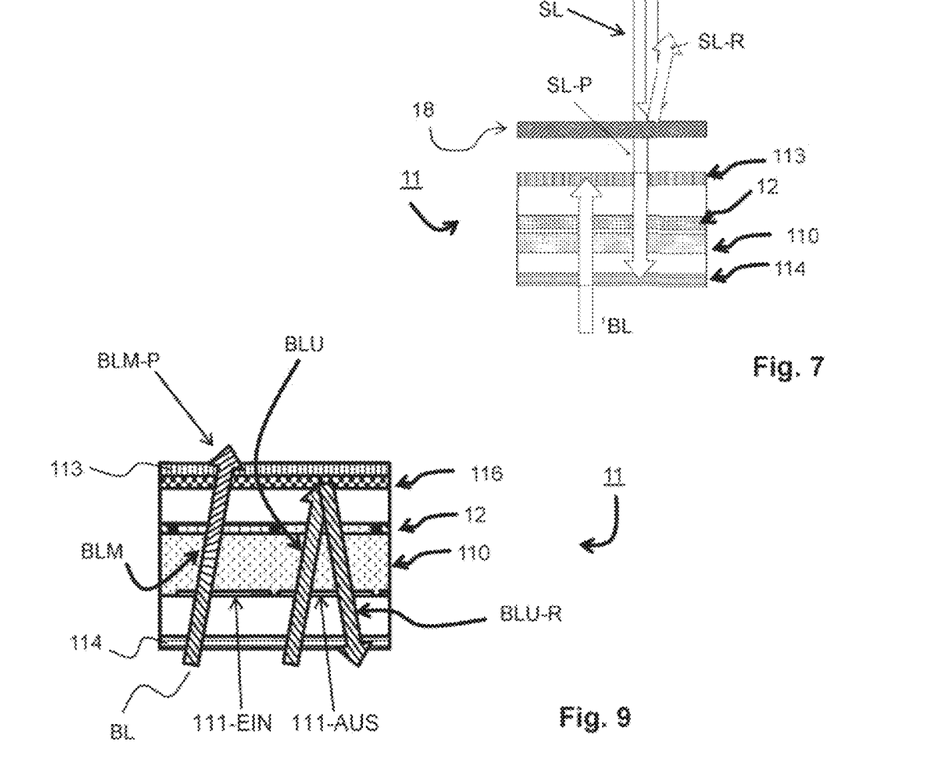
FIG. 7 shows a known solution to shield sunlight from a liquid crystal display.
FIG. 9 shows a liquid crystal display according to the disclosure.

FIG. 7 shows a known solution to shield sunlight SL from a liquid crystal display 11 similar to the one shown in FIG. 5 above. A reflective polarizer 18 is used to prevent a part of the sunlight SL (with a polarization perpendicular with the front polarizer 113) to hit the display. This part is reflected as reflected sunlight SL-R, while only the remaining part passes as passed sunlight SL-P. In fact, the solution proposed according to the present disclosure may work also in conjunction with the solution shown here as a measure to further reduce the light absorption into the display panel.

Figure 8:
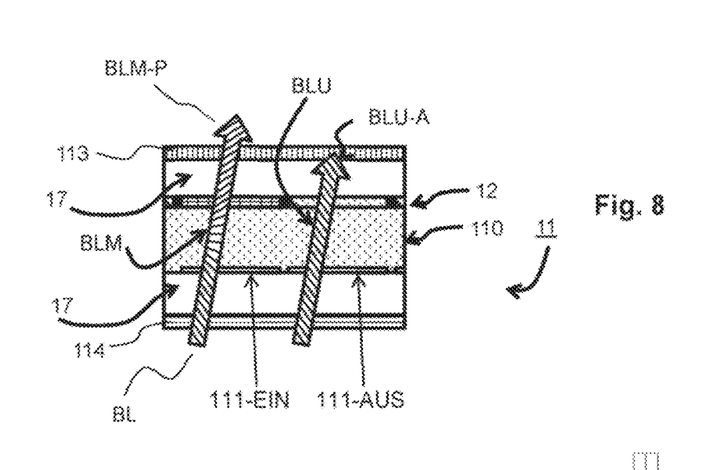
FIG. 8 shows how backlight heats up a liquid crystal display.

FIG. 8 shows how backlight BL heats up a liquid crystal display 11. For the present disclosure, the reflective polarizer 116 layer should be aligned such that it reflects the light that has the polarization plane perpendicular to that required by the front polarizing layer 113. This requirement may be better understood by comparing the standard display application with the proposed disclosure. In the standard application, considering two adjacent pixels for ease of illustration with one pixel in an ON configuration, pixel driving element in ON-state 111-ON, (i.e. set to a clear state) and the other one in an OFF configuration, pixel driving element in OFF-state 111-OFF, (i.e. in an opaque state) as depicted in the figure, it may be seen that the front polarizer 113 layer basically absorbs the unmodulated backlight BLU passing the OFF pixel 111-OFF. For the ON pixel 111-ON, the backlight that enters the display, polarized according to the back polarizer 114, gets its polarization plane rotated by the liquid crystal layer 110 in such a way as to align it with that required by the front polarizer 113. Once the modulated backlight BLM passes through the colour filter 12 layer, since it is properly aligned with the front polarizer 113, it will be able to exit the pixel 111-ON from the front side of the display. For the OFF pixel 111-OFF, since the polarization plane of the backlight BL is not rotated by the liquid crystal layer 110, the unmodulated light BLU that passes the colour filter 12 will be absorbed by the front polarizer 113. Assuming a properly polarized backlight BL and some typical values for the light transmission or reflection coefficients of the different display components (around 5% reflection on the backside, around 90% transmission for a polarizer for the light properly aligned, around 80% to 90% transmission for the liquid crystal and all other clear layer like glass supports, 30% for the colour filter, 70% given by the pixel aperture ratio), around 15% (0.95×0.9×0.8 to 0.9×0.3×0.7) of the incoming polarized backlight will be directly absorbed by the front polarizer 113. This situation changes for the configuration according to the present disclosure, as depicted in the next figure.

FIG. 9 shows a liquid crystal display 11 according to the disclosure. Here, for the ON pixel 111-ON, once the modulated backlight BLM passes through the colour filter 12 it will reach the reflective polarizer 116 layer. Given that the reflective polarizer 116 is aligned to reflect the light that has the polarization plane perpendicular to that of the front polarizer 113 and that the backlight was modulated by the pixel, it results that the modulated backlight BLM will pass through this layer with only a minor influence and, in the end, will exit the display as passed modulated backlight BLM-P similar with the known case. For the OFF pixel 111-OFF however, once the light reaches the reflective polarizer 116, since it is just unmodulated backlight BLU that has the polarization plane aligned with that required by the reflective part of the additional film it will be reflected as reflected unmodulated backlight BLU-R towards the backside of the display. This effectively means the above calculated 15% of the polarized backlight will no longer be absorbed by the front polarizer 113, decreasing in this way the instant thermal load on the layer. This configuration effectively translates in an increase in the thermal inertia of the front polarizer 113—i.e. when the HUD is subjected to a thermal shock, the front side of the panel will reach the same temperatures at later times compared to the state of the art displays, allowing for better system performance. The reflected light BLU-R will pass again through the colour filter 12 where an important fraction of it will be absorbed again and then again through the liquid crystal layer 110. Because the liquid crystal material is configured such that the polarization plane is not rotated at 111-OFF, the reflected light BLU-R passes through this layer without any modulation and reaches again the back polarizer 114. Since no polarization modulation was performed on the light that reflected off from the reflective polarizer 116, the remaining fraction of the light will exit the backside of the display 11. Considering ideal reflective performance for the reflective polarizer 116, given the above-mentioned typical values, around 30% of the remaining light passes the colour filter 12, 70% the pixel apertures of the black matrix 1210, then around 80 to 90% the liquid crystal layer 110 and other clear layers and around 90% passes again through the back polarizer 114. In total, considering the round trip of the backlight, about 2.5% of the incoming polarized backlight gets reflected back outside of the display 11 panel, further reducing the thermal load on the display resulting from the luminous power of the backlight. The reflective polarizer 116 may be implemented as a stack of alternating layers of different polymeric materials or preferably as metal wire grid polarizer such as aluminium wire grid polarizer.

When compared to known displays, by having a reflective polarizer 116 layer interposed between the normal display structure and the normal polarizer layer, a large fraction of the incoming light is no longer dissipated in the polarizer layer. This is equivalent with an increase in the thermal inertia of the polarizer 113 layer as it will reach the same temperature after a longer period of time when compared to known applications. Additionally, by having the reflective polarizer 116 layer, a fraction of the light that otherwise would have been absorbed by the polarizer layer is able to 113 exit the display panel, further reducing the thermal load on the display. Other potential fields of use of the present disclosure are near-eye displays, virtual/augmented reality head-sets, or head-up applications in nonautomotive fields. The simplest implementation shown here has a reflective polarizer 116 layer interposed between the display 11 structure and the front polarizer 113. This configuration requires no significant changes in the known display manufacturing process and the additional cost incurred by the modification is expected to be very low.

Figure 10:
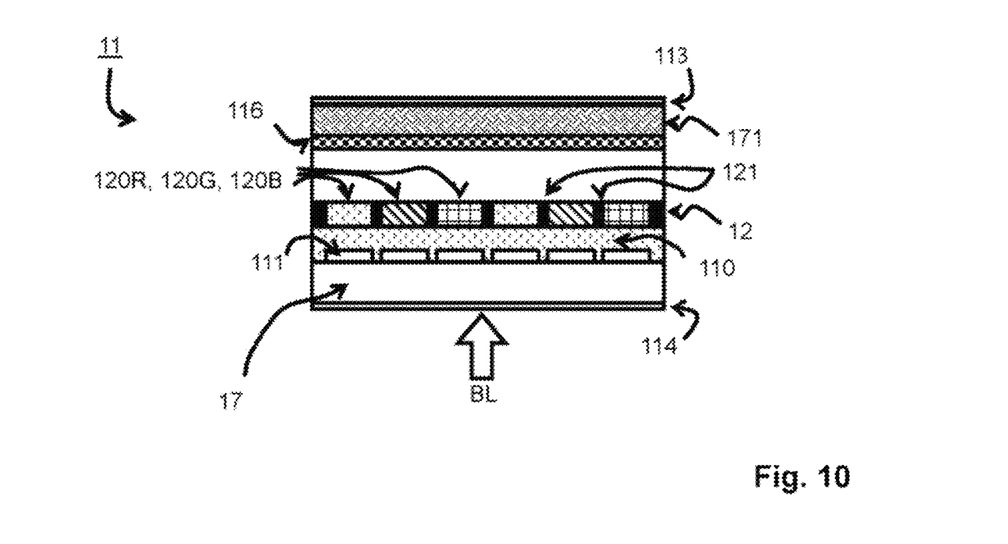
FIG. 10 shows another liquid crystal display according to the disclosure.

FIG. 10 shows another liquid crystal display 11 according to the disclosure. Instead of the reflective polarizer 116 being immediately adjacent to the front polarizer 113 it is, as illustrated here, separated from the front polarizer 116 by an optically clear medium 171. Without being limited to the following descriptions, this optically clear medium 171 may act as an additional thermal barrier between the display 11 structure and the front polarizer 113, further delaying the moment when the front polarizer 113 would reach its maximum temperature. In this situation, this optically clear medium 171 preferably is implemented as an air gap.

In another embodiment, the optically clear medium 171 may have a high thermal conductivity and act as a heat transport device. In this implementation, the heat that is generated inside the display panel may be evacuated towards the edges of the display where it can be more easily managed. Furthermore, given the higher thermal conductivity of metals, a similar effect of heat transport may be achieved if the reflective polarizer 116 being implemented with the aid of a metal wire grid polarizer.

Figure 11:
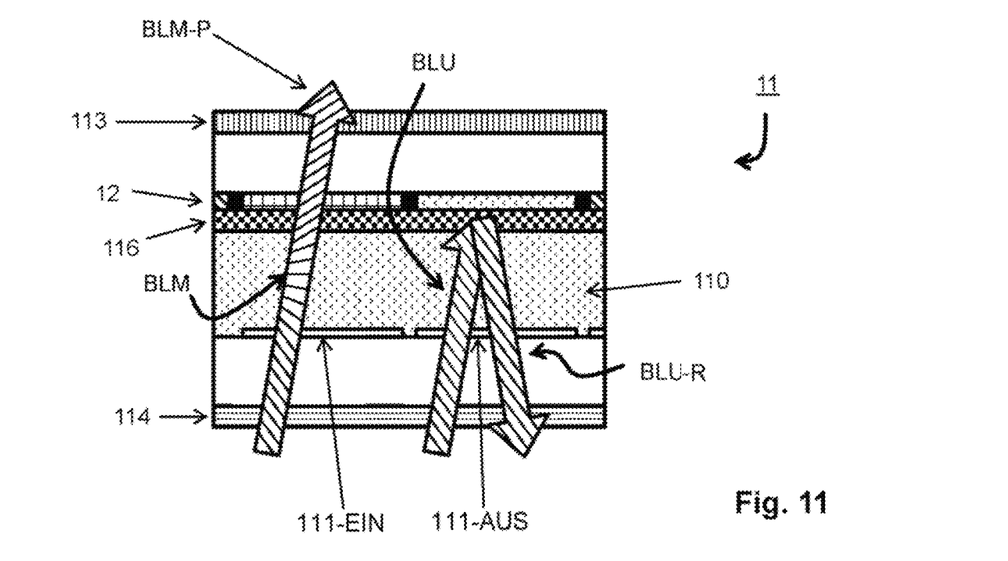
FIG. 11 shows another implementation according to the disclosure.

FIG. 11 shows another implementation of the present disclosure. Here, the reflective polarizer 116 layer is placed between the liquid crystal layer 110 and the colour filter 12 layer. In this implementation, display structures that separate the reflective polarizer 116 and the front polarizer 113 act in the same manner as the previously described optically clear medium 171. As it can be seen, this variation allows the reflection of the unmodulated backlight BLU to happen before it reaches the colour filter layer 12. A substantially larger fraction of the light that otherwise would have been absorbed by the display panel is reflected away from it. Given that the colour filter 12 absorbs around 70% of the incident light, the advantage of having the reflective polarizer 116 placed before the colour filter 12 becomes clear. Since in the previously described solutions the reflected backlight BLU-R passes two times through the colour filter 12, almost all of the light is absorbed in it. Without passing through the colour filter 12 and using the values previously computed, for an ideal reflective polarizer, around 30% to 40% of the incoming unused polarized backlight would be reflected back out of the display, significantly decreasing the thermal load on the display. As a note, this proposed configuration may require some LCD manufacturing process changes and thus might incur higher costs.

Figure 12:
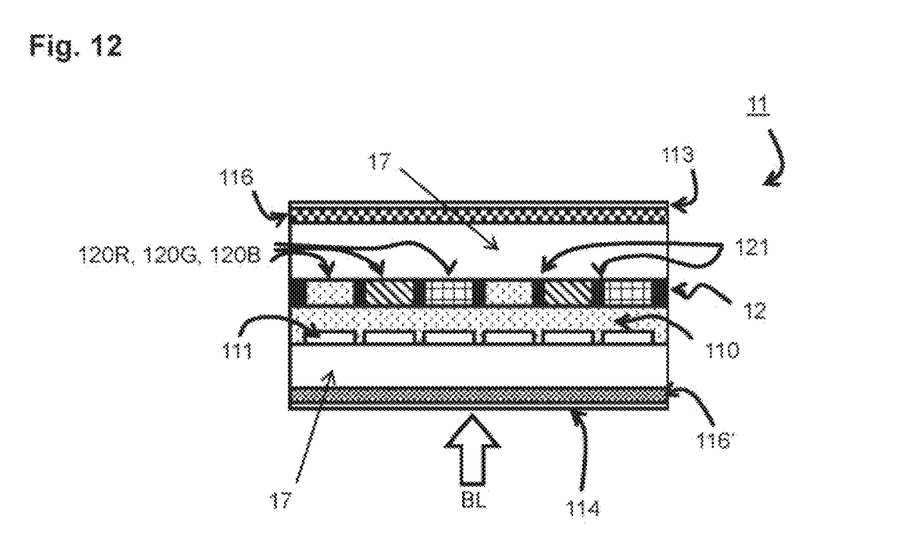
FIG. 12 shows another implementation according to the disclosure.

FIG. 12 shows another implementation according to the disclosure using a reflective polarizer 116 at the front side of the display 11 and another reflective polarizer 116' at its backside. As a note, although the following depiction has the reflective polarizers 116, 116' immediately adjacent to the absorbing polarizers 113, 114, this should not be regarded as a limitation as all implementations where any of the reflective polarizers 116, 116' is separated from the absorbing polarizer 113, 114 by an optically clear medium 171 as previously illustrated are possible without departing from the initially proposed idea. In this configuration, the front reflective polarizer 116 is aligned with the front polarizer 113 as described for the previous embodiments while the back side reflective polarizer 116' is aligned with the back polarizer 114 in a similar fashion. In this configuration the incoming sunlight SL that enters the display panel from the front side will no longer be dissipated also in the back polarizer 114 as, similarly with the previous embodiment, it will be reflected towards the front side. Similarly, around 2.5% of the incoming sunlight SL will be reflected out of the display. As a possible drawback of this configuration it might be regarded that the colour filter 12 now dissipates virtually all of the incoming light, both from the front side and from the backside of the display. With this, although the front and back polarizers 113, 114 may perform better at thermal transients, it is possible that the liquid crystal layer reaches sooner the clearing temperature as it is located very close to the colour filter 12. One possible way to mitigate this is shown in the next figure.

Figure 13:
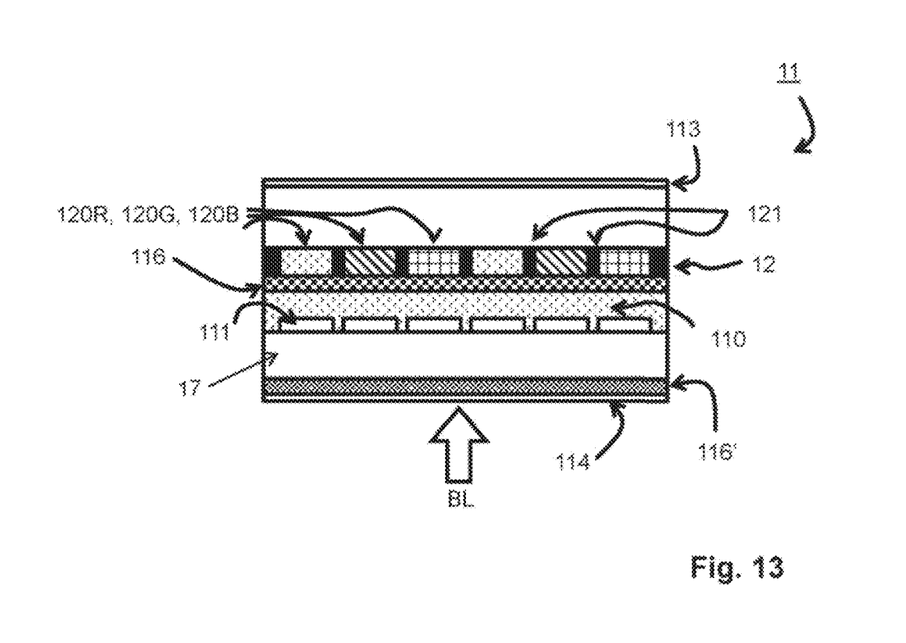
FIG. 13 shows another implementation according to the disclosure.

FIG. 13 shows another implementation of the disclosure. Here, the front side reflective polarizer 116 is placed between the colour filter 12 and the liquid crystal layer 110 as in the second proposed embodiment. In this way, the colour filter 12 dissipates mainly only the sunlight SL.

In other words, the present disclosure relates to the problem that head-up displays require very bright backlight in order to generate a virtual image that is visible even under bright outside light conditions. In head-up displays most display areas are black, as usually only symbols are shown. This means that a large part of the backlight is dissipated in the display, causing heat. Liquid-crystal materials do not operate properly above a certain temperature, the so-called clearing temperature. It is desired to keep the liquid-crystal material's temperature below the clearing temperature. According to the disclosure a reflective polarizer is added below the front polarizer so that backlight for dark areas is not dissipated within the liquid-crystal panel, but is reflected back and dissipated outside the liquid-crystal panel. This allows the head-up display to work properly also in situations with high temperatures and high brightness.

The invention claimed is:

1. A head-up display unit, the head-up display unit comprising:
a picture generating unit for creating an image to be displayed as a virtual image to a viewer, wherein the picture generating unit comprises a liquid crystal layer, a front polarizer, a back polarizer, and a reflective polarizer, wherein the reflective polarizer is arranged upstream the front polarizer and downstream the liquid crystal layer, wherein an optically clear medium is provided between the reflective polarizer and the front polarizer, wherein the optically clear medium is a highly thermally conducting material, wherein the thermal conductivity of the optically clear medium is higher than the thermal conductivity of the front polarizer and the reflective polarizer, and wherein the optically clear medium evacuates heat generated inside the display panel towards the edges of the display; and
an optical unit for projecting the image to be displayed towards an eyebox.

2. The head-up display unit according to claim 1, wherein the reflective polarizer is a metal grid polarizer.

3. The head-up display unit according to claim 1, wherein a colour filter is arranged downstream the reflective polarizer.

4. The head-up display unit according to claim 1, wherein a backside reflecting polarizer is arranged downstream the back polarizer.

5. A vehicle with a head-up display unit for generating an image for a user of the vehicle, comprising:
a picture generating unit for creating an image to be displayed as a virtual image to a viewer, wherein the picture generating unit comprises a liquid crystal layer, a front polarizer, a back polarizer, and a reflective polarizer, wherein the reflective polarizer is arranged upstream the front polarizer and downstream the liquid crystal layer, wherein an optically clear medium is provided between the reflective polarizer and the front polarizer, wherein the optically clear medium is a highly thermally conducting material, wherein the thermal conductivity of the optically clear medium is higher than the thermal conductivity of the front polarizer and the reflective polarizer, and wherein the optically clear medium evacuates heat generated inside the display panel towards the edges of the display; and
an optical unit for projecting the image to be displayed towards an eyebox.

* * * * *